(12) United States Patent
Eckert et al.

(10) Patent No.: US 6,302,823 B1
(45) Date of Patent: Oct. 16, 2001

(54) METHOD AND DEVICE FOR MANEUVERING MOTOR VEHICLES

(75) Inventors: Alfred Eckert, Mainz; Jürgen Diebold, Eschborn; Stefan Drumm, Saulheim; Thomas Berthold, Darmstadt, all of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/555,676

(22) PCT Filed: Dec. 3, 1998

(86) PCT No.: PCT/EP98/07860

§ 371 Date: Aug. 18, 2000

§ 102(e) Date: Aug. 18, 2000

(87) PCT Pub. No.: WO99/29531

PCT Pub. Date: Jun. 17, 1999

(30) Foreign Application Priority Data

Dec. 4, 1997 (DE) .............................. 197 53 764

(51) Int. Cl.⁷ .................................................. B60K 41/20
(52) U.S. Cl. .............................................................. 477/186
(58) Field of Search ..................... 477/186, 185, 477/208

(56) References Cited

U.S. PATENT DOCUMENTS

| | | |
|---|---|---|
| 4,446,950 | 5/1984 | Wise et al. . |
| 4,969,103 | 11/1990 | Maekawa . |
| 5,007,516 * | 4/1991 | Miyazaki ........................ 192/0.072 |

FOREIGN PATENT DOCUMENTS

| | | |
|---|---|---|
| 32 38 196 | 4/1984 | (DE) . |
| 33 34 723 | 4/1985 | (DE) . |
| 34 21 387 | 12/1985 | (DE) . |
| 35 23 352 | 1/1986 | (DE) . |
| 35 03 055 | 7/1986 | (DE) . |
| 38 13 083 | 11/1989 | (DE) . |
| 38 23 387 | 1/1990 | (DE) . |
| 39 36 925 | 5/1990 | (DE) . |
| 41 18 332 | 12/1991 | (DE) . |
| 44 25 419 | 12/1995 | (DE) . |
| 195 23 235 | 1/1997 | (DE) . |
| 19753764-A1 * | 6/1999 | (DE) . |
| 2 053 394 | 2/1981 | (GB) . |
| 61-247525 | 11/1986 | (JP) . |
| 62-255252 | 11/1987 | (JP) . |
| 08175230-A * | 7/1996 | (JP) . |
| 2000190829-A * | 7/2000 | (JP) . |

OTHER PUBLICATIONS

Search Report of the German Patent Office for Application No. 197 53 764.2.

* cited by examiner

Primary Examiner—Dirk Wright
(74) Attorney, Agent, or Firm—Rader, Fishman & Grauer PLLC

(57) ABSTRACT

The present invention relates to a maneuvering assistance system for automotive vehicles and a method of maneuvering automotive vehicles which permit a simple and safe maneuvering of the automotive vehicle particularly during a parking procedure. The present invention is especially advantageous when the automotive vehicle needs to be maneuvered, for example, on a steep positive or negative gradient. According to the present invention, a preselected or adjustable maneuvering speed is chosen such that the driver is not surprised by unwanted reactions of the automotive vehicle. The present invention especially comprises an accelerator pedal sensor [(5)] for detecting an accelerator pedal position [(α)] and a device for determining a speed [($v_{ref}$)] of the vehicle. By using values pertaining to the accelerator pedal position [(α)], to the accelerator pedal depression speed [($\dot{α}$)], and the vehicle speed [($v_{ref}$)], a control unit [(4)] determines whether the vehicle is in a maneuvering or parking condition, in order to accordingly actuate an engine [(6)] or a brake control system [(3)] so that the vehicle [(1)] is moved at a desired maneuvering speed.

11 Claims, 3 Drawing Sheets

METHOD AND DEVICE FOR MANEUVERING MOTOR VEHICLES

TECHNICAL FIELD

The present invention relates to a maneuvering assistance system for automotive vehicles and a method of maneuvering automotive vehicles which permit moving the vehicle in a load-independent, safe and unproblematic way. More particularly, this invention relates to a parking aid.

BACKGROUND OF THE INVENTION

Difficulties may be involved in parking vehicles that are equipped with powerful engines and automatic transmissions into a parking space and maneuvering them, depending on the upgrade/downgrade or the engine characteristics. For example, when maneuvering a vehicle rearwards into a parking space on a sloping road, it is often difficult for the driver to adjust the vehicle speed by way of the accelerator pedal in a manner which permits a safe and unproblematic parking maneuver. It is frequently necessary to simultaneously apply the accelerator pedal and the brake pedal in order to smoothly maneuver the vehicle during the parking procedure. Undesirable vehicle reactions may frequently occur which demand too much from the driver or at least render maneuvering difficult.

DE 33 34 723 describes a device for controlling an engine and/or an automatic transmission of automotive vehicles which includes an engine maneuvering control device containing a maneuvering program by which the bottom control range of an accelerator pedal, for low vehicle speeds or engine rotational speeds, is associated with an adjustment travel of the accelerator pedal which is increased compared to the normal operation.

JP 62-255252 discloses a method of controlling the creeping speed of vehicles wherein signals from sensors for the engine rotational speed, the accelerator pedal and the parking brake are sensed and evaluated, and wherein when conditions for creeping speed prevail, the engine or the brakes of the vehicle are controlled correspondingly.

An object of the present invention is to provide a maneuvering assistance system for automotive vehicles and a method of maneuvering automotive vehicles which permit moving the vehicle in a low-speed range in a load-independent, safe and unproblematic way.

According to the present invention, the maneuvering assistance system for automotive vehicles includes an acceleration pedal sensor for determining an accelerator pedal position $\alpha$. Further, it may comprise a device for determining a vehicle speed $v_{ref}$ and there may be provision of a control unit which receives the accelerator pedal position $\alpha$ and the vehicle speed $v_{ref}$. The control unit may either infer from the detected accelerator pedal position $\alpha$ and the vehicle speed $v_{ref}$ whether the vehicle is in a maneuvering condition, or the control unit may receive such an information by way of an additional input which is e.g. initiated by the driver. Of course, it is also possible to combine the above-mentioned input information to conclude that a maneuvering condition prevails. When the control unit has detected a maneuvering condition, a drive assembly and/or a brake control system can actuate the vehicle in such a manner that it is moved at a maneuvering speed.

The maneuvering assistance system of the present invention may assume that a maneuvering condition prevails when the accelerator pedal position $\alpha$ is inferior, or equal to, a limit value $\alpha_{limit}$, when a first derivative $\dot\alpha$ of the accelerator pedal position $\dot\alpha$ is inferior, or equal to, a limit value $\dot\alpha_{limit}$, and/or when the vehicle speed $v_{ref}$ is inferior, or equal to, a limit value $v_{limit}$.

In addition, the control unit can take into account as a condition for the existence of a maneuvering condition that a second derivative $\ddot\alpha$ of the accelerator pedal position $\alpha$ is inferior, or equal to, a limit value $\ddot\alpha_{limit}$.

Thus, the present invention favorably permits determining from sensed signals of the accelerator pedal position $\alpha$ and/or the vehicle reference speed $v_{ref}$ whether there is a maneuvering condition, i.e., whether the driver desires to perform a parking procedure, for example. Especially, such a parking procedure may be inferred when the driver depresses the accelerator pedal only to a small extent, the speed of depression of the accelerator pedal is low and, in addition, the vehicle speed is below the above-mentioned limit value. When a parking procedure was detected, a so-called low speed maneuvering (LSM) prevails. This LSM control may then be influenced by the driver either by way of single-pedal operation or two-pedal operation.

In the single-pedal operation, a sensed application of the accelerator pedal corresponds to an adjustment of the maneuvering speed, and release of the accelerator pedal corresponds to deceleration of the vehicle, along with a related actuation of a parking brake when the vehicle speed $v_{ref}=0$. Thus, the driver can control the parking procedure only by application of the accelerator pedal, and the vehicle slows down automatically when the driver takes his/her foot from the accelerator pedal and, in addition, the parking brake is activated automatically when the vehicle is at standstill. The maneuvering speed can be maintained constant in this arrangement, irrespective of which accelerator pedal position is chosen by the driver (of course, within the above-mentioned limits of $0<\alpha<\alpha_{limit}$).

Another variant would imply adapting the maneuvering speed to the extent of depression of the accelerator pedal by way of a corresponding function. However, this would also be executed only within the above-mentioned limits ($0<\alpha<\alpha_{limit}$).

With a two-pedal operation, a sensed application of the accelerator pedal corresponds to the adjustment of an acceleration of the vehicle, a non-application of the accelerator pedal and of a brake pedal corresponds to maintaining the maneuvering speed constant, and an application of the brake pedal corresponds to a reduction of the maneuvering speed, along with a related actuation of a parking brake when the vehicle speed $v_{ref}=0$.

As described above, an effective and simple control of the parking procedure can be performed both by the single-pedal operation and the two-pedal operation, with a subsequent actuation of the parking brake when the parking procedure is completed.

It should be noted in particular that the entire parking procedure is absolutely independent of load. This means that e.g. in the presence of a major gradient (positive and/or negative gradient, with a high vehicle weight, etc.), the same parking speed is adjusted by the LSM controller as on flat grounds and with a completely unloaded vehicle. This provides the driver with an auxiliary module which enables him/her to safely maneuver and/or pull the vehicle into a parking space in every situation.

Further, the maneuvering characteristics of the vehicle may approach a normal characteristics which corresponds to the current vehicle performance at rising vehicle speeds $v_{ref}$ with more depressed accelerator pedal positions a, and/or with quicker accelerator pedal applications $\dot\alpha$. This means in particular that, for example, with an accelerator pedal speed $0<\dot{\alpha}<\dot{\alpha}_{limit}$ the maneuvering characteristics still further approaches the normal characteristics at rising accelerator pedal application speeds. Especially, another degree of freedom is thereby introduced which achieves additional possibilities of adaption of the maneuvering characteristics. This renders it possible to softly adapt the vehicle reactions, i.e., to achieve a smooth transition between the maneuvering characteristics and the normal characteristics of the vehicle. The term 'vehicle reaction' means a reaction of the vehicle caused by inputs of the driver.

Further, there may be provision of a selection device for selecting a maneuvering condition according to the present invention. Such a selection device would e.g. be a switch, a push button, or a similar element, which will be actuated by the driver when he/she wishes to maneuver the vehicle. The maneuvering condition desired by the driver can then be detected by the control unit, and an LSM operation may be performed. When the vehicle is in such an LSM condition, the driver could just as well fully depress the accelerator pedal, and the vehicle would pull into the parking space at the maneuvering speed chosen. Of course, the maneuvering speed could also be adapted between a slightly depressed accelerator pedal position and the maximum depressed accelerator pedal position, and the maximum predetermined maneuvering speed would be adjusted with the maximum depressed accelerator pedal position. Of course, the above-mentioned selection device for selecting a maneuvering condition could also be combined with the above-mentioned detection possibilities for the maneuvering condition.

Further, a ranging sensor may be provided according to the present invention which slows down the vehicle when a minimum distance from an obstacle, for example, another vehicle, is reached, with the parking brakes being then activated automatically.

DETAILED DESCRIPTION OF THE PREFERRED EMBODIMENT

Figure 1:
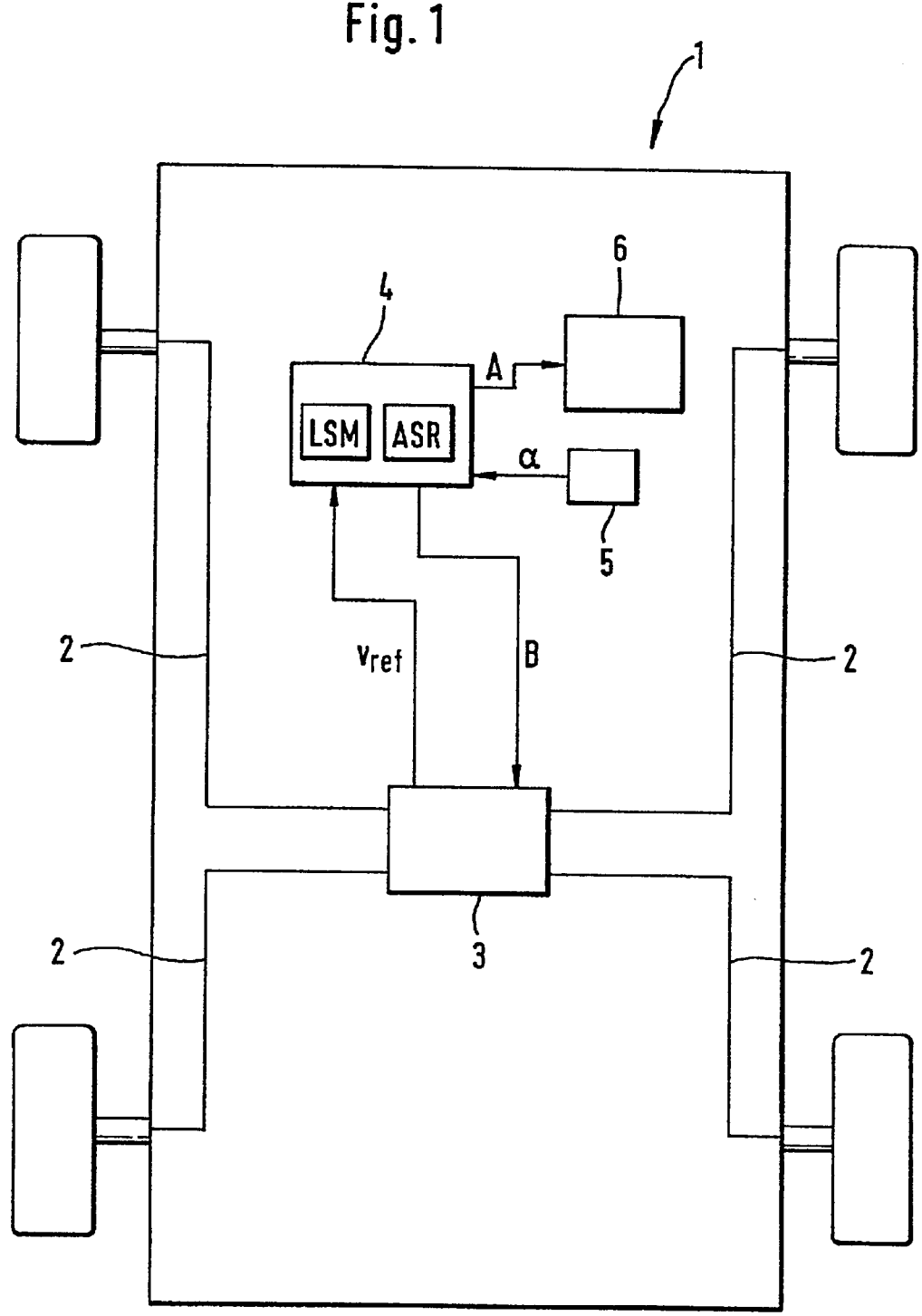
FIG. 1 is a diagrammatic representation of an automotive vehicle.

An automotive vehicle 1 with brake lines 2 is shown in the embodiment of FIG. 1. The brake lines may be hydraulic brake lines 2 or also electric signal lines for actuating corresponding actuators to achieve a brake effect. The brake lines are driven by way of a brake control system 3. The brake control system 3 may include an ABS control function and output the vehicle speed $v_{ref}$. The vehicle speed $v_{ref}$ is received by a control unit 4. The control unit 4 can contain an LSM controller and an ABS/TCS function. Of course, the brake control system 3, the LSM controller, and the ABS/TCS controller can be combined in a control unit, or can be designed separately. The LSM controller can receive a signal indicative of the position of the accelerator pedal from an accelerator pedal sensor 5. Further, the LSM controller can issue a control signal A to engine 6. This control signal A could cause the engine 6 to accelerate the vehicle 1 or decelerate the vehicle 1 (by reducing the engine output). The LSM controller may also output a control signal B to the brake control system 3 in order to directly initiate deceleration of the automotive vehicle 1 by way of the service brakes. Also, a parking brake (not shown) may be activated by the control signal B.

The parking brake function could e.g. be achieved by application of two brakes (for example, the two front-wheel brakes).

Because engine control mostly operates in response to the normal driver input for engine management (electronically controlled acceleration device), the engine torque may e.g. be reduced by control along with the TCS interface. The engine torque which develops on the driving axle may be reduced further, if necessary, by brake intervention (booster and/or parking brake). With a vehicle at standstill, the parking brake would be activated in any case (what will be described more closely hereinbelow).

Figure 2:
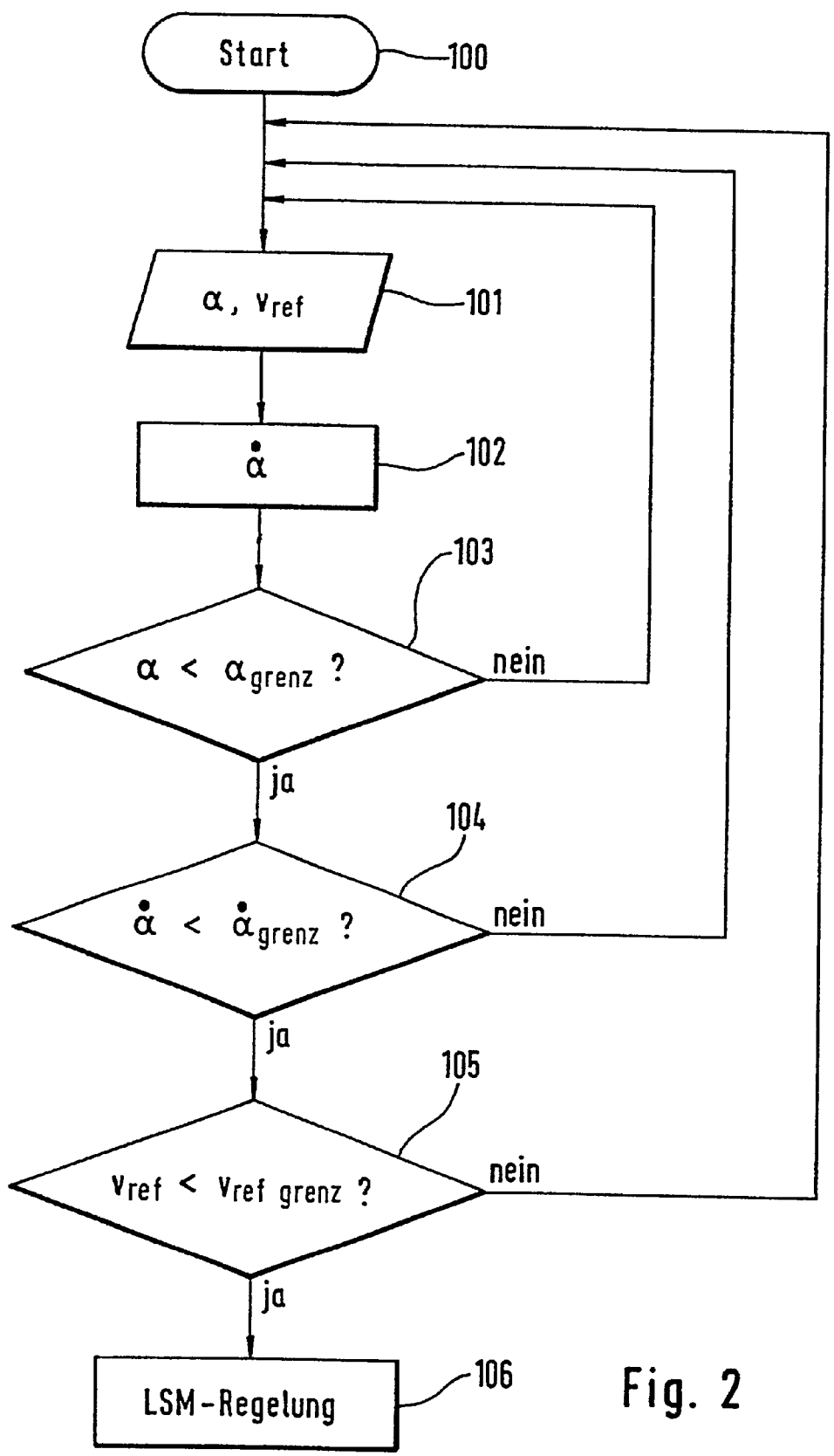
FIG. 2 is a flow chart to identify the existence of an LSM condition.

The embodiment of FIG. 2 shows an example of a function sequence where it can be judged cyclically whether LSM control shall take place.

After the start in step 100, the current accelerator pedal position a and the current vehicle speed $v_{ref}$ are read in a step 101. As has already been mentioned above, the current vehicle speed $v_{ref}$ can be tapped by the ABS controller.

The first derivative $\dot{\alpha}$ of the accelerator pedal position α is determined in a step 102. If necessary, the second derivative of the accelerator pedal position can also be determined in this step (not shown).

An interrogation is made in step 103 whether the detected accelerator position a is inferior a limit value $\alpha_{limit}$. In the negative, a return branch between step 100 and step 101 is followed. When the accelerator pedal position is inferior the limit value $\alpha_{limit}$, a branch to step 104 is followed where it is polled whether the speed of depression of the accelerator pedal $\dot{\alpha}$ is lower than the limit value $\dot{\alpha}_{limit}$. In the negative, a return branch between step 100 and step 101 is followed. If the speed of depression of the accelerator pedal $\dot{\alpha}$ is lower than the limit value $\dot{\alpha}_{limit}$, a branch to step 105 is followed where it is polled whether the vehicle speed $v_{ref}$ is lower than a limit value $v_{ref\ limit}$. In the negative, a return branch between steps 100 and 101 is followed. If the vehicle speed $v_{ref}$ is lower than the limit value $v_{ref\ limit}$, the LSM control will be activated in a step 106.

As described hereinabove, the LSM control can be influenced by the driver by way of a single-pedal operation (accelerator pedal) as a speed input and/or by way of a two-pedal operation (accelerator pedal/brake pedal) as an acceleration input.

In the single-pedal operation, the accelerator pedal position a corresponds to a defined speed in terms of maneuvering speeds, that is, for example, 'α=constant' means a constant vehicle speed $v_{ref}$, and release of the accelerator pedal means 'halt'. For rising speeds, the changed characteristic curve approaches the normal characteristic curve, exactly as is the case with quick accelerator pedal applications or larger angles a (see FIG. 3). This renders it possible to the driver to operate at a constant speed irrespective of any marginal conditions (such as road incline, load, etc.). Because the control mostly operates by command of the normal driver input for the engine management (electronically controlled acceleration device), the engine management may be reduced by control along with the TCS interface.

In a two-pedal operation, the accelerator pedal position a corresponds to an acceleration, i.e., α=constant can mean a constant acceleration. When no pedal is applied, the speed $v_{ref}$ achieved is maintained constant. Application of the brake has a direct effect in the form of deceleration. For rising speeds, the changed characteristic curve may approach the normal characteristic curve, the same applies to quick acceleration pedal applications or larger angles α (see FIG. 4).

Figure 3:
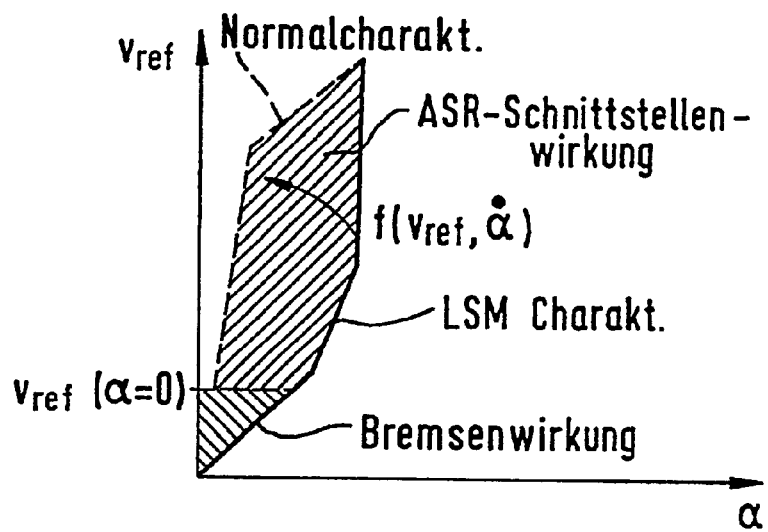
FIG. 3 is a graph illustrating the maneuvering characteristics of the vehicle for a single-pedal operation.

To explain the above-mentioned control principles of the LSM controller, FIG. 3 exhibits a graph showing the accelerator pedal position a as the abscissa and the vehicle speed $v_{ref}$ as the ordinate. The speed $v_{ref}$ (α=0) corresponds to a vehicle speed, with the brake released and an accelerator pedal position α=0. When the brake is released and the accelerator pedal is not applied in an automatic transmission, creeping movement of the vehicle usually occurs which depends on the torque converter, the engine performance, the road incline, etc. If, for example, the speed $v_{ref}$ is lower than the speed $v_{ref}$ (α=0), the brakes of the vehicle will be applied, e.g. by way of the control signal B shown in FIG. 1 (this zone is designated by the term 'brake effect' in FIG. 3).

The LSM characteristic curve is illustrated by the solid line and the normal characteristic curve by the dotted line. As shown, the LSM characteristic curve will approach the normal characteristic curve depending on the vehicle speed $v_{ref}$ and the speed of depression of the accelerator pedal α̇. A zone of effect of the TCS interface where the engine is correspondingly reduced by control in order to adjust the desired maneuvering speed lies between the LSM characteristic curve and the normal characteristic curve.

Figure 4:
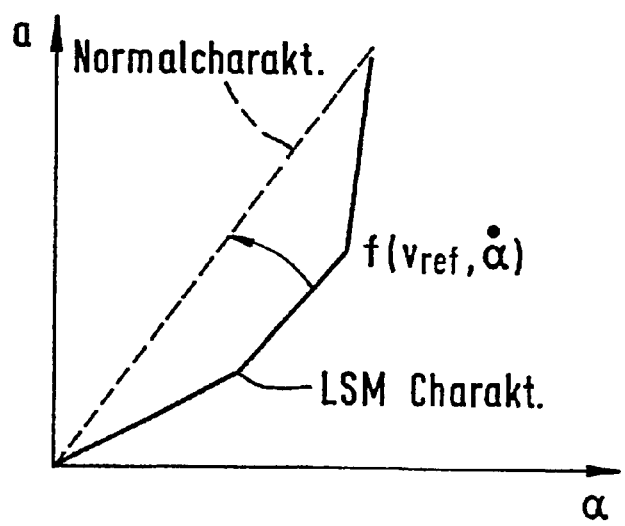
FIG. 4 is a graph illustrating the maneuvering characteristics of the vehicle for a two-pedal operation.

The accelerator pedal position a is illustrated as the abscissa and the vehicle deceleration a is illustrated as the ordinate in FIG. 4. The LSM characteristic curve is shown as a solid line and the normal characteristic curve as a dotted line in this graph. Exactly as in the embodiment of FIG. 3, the LSM characteristic curve approaches the normal characteristic curve in dependence on the vehicle speed $v_{ref}$ and the accelerator pedal speed of depression α̇.

As is shown among others in FIGS. 3 and 4, a soft adaption of the LSM characteristic curve to the normal characteristic curve may occur with changing marginal conditions.

Further, it should be noted that the LSM characteristic curve may also approach the normal characteristic curve depending on α̇. Of course, the approach of the characteristic curve may also depend on any desired combination of the values $v_{ref}$, α, and/or α̇.

What is claimed is:

1. Maneuvering assistance system for automotive vehicles, comprising:
    an accelerator pedal sensor for detecting an accelerator pedal position and generating a signal representative of said accelerator pedal position,
    a device for determining a vehicle speed and generating a vehicle speed signal representative of said vehicle speed and
    a control unit for receiving the accelerator pedal position signal and the vehicle speed signal and for detecting whether the vehicle is in a maneuvering condition, wherein upon the existence of such a maneuvering condition, a drive assembly or a brake control system of the vehicle will be actuated so that the vehicle is moved at a maneuvering speed,
    means for concluding that a maneuvering condition prevails when the accelerator pedal position is inferior, or equal to, a limit value, when a first derivative of the accelerator pedal position is inferior, or equal to, a limit value, or when the vehicle speed is lower than, or equal to, a limit value.

2. Maneuvering assistance system as claimed in claim 1, wherein the control unit further includes means for taking into account as a condition for the existence of a maneuvering condition, that a second derivative of the accelerator pedal position is inferior, or equal to, a limit value.

3. Maneuvering assistance system as claimed in claim 1, wherein said drive assembly and said brake control system is controlled by way of a single-pedal operation, wherein a detected application of the accelerator pedal corresponds to an adjustment of the maneuvering speed, and release of the accelerator pedal corresponds to a deceleration along with a related actuation of a parking brake, when the vehicle speed equals 0.

4. Maneuvering assistance system as claimed in claim 1, wherein said drive assembly and said brake control system is controlled by way of a two-pedal operation, wherein a detected application of the accelerator pedal is interpreted as a demand to adjust the accelerator, a non-application of the accelerator pedal and a brake pedal is interpreted as a demand for maintaining the maneuvering speed constant, and an application of the brake pedal is interpreted as a demand for reducing the maneuvering speed along with a related actuation of a parking brake, when the vehicle speed equals 0.

5. Maneuvering assistance system as claimed in claim 1, wherein characteristics of the vehicle reaction are controlled such that, starting from the maneuvering characteristics, they approach a normal characteristic with rising vehicle speeds, with more depressed accelerator pedal positions or at quicker accelerator pedal applications.

6. Maneuvering assistance system as claimed in claim 6, further including a selection device for selecting a maneuvering condition.

7. Maneuvering assistance system as claimed in claim 6, wherein the control unit upwardly adjusts the maneuvering speed when the accelerator pedal is applied and downwardly adjusts the vehicle speed when the accelerator pedal is released, and wherein the control unit actuates a parking brake when the vehicle speed equals 0.

8. Maneuvering assistance system as claimed in claim 1, wherein the maneuvering speed is maintained constant in the maneuvering condition.

9. Maneuvering assistance system as claimed in claim 1, wherein the maneuvering speed rises with an increasingly depressed accelerator pedal in the maneuvering condition.

10. Maneuvering assistance system as claimed in claim 1, further including a ranging sensor for issuing an alarm signal to the control unit when a predetermined minimum distance from an obstacle is reached.

11. Method of maneuvering automotive vehicles, comprising the steps of:
    detecting an accelerator pedal position,
    detecting a vehicle speed,
    receiving the accelerator pedal position and the vehicle speed in a control unit, wherein the control unit is effective for
    determining whether the vehicle is in a maneuvering condition and, when such a condition prevails, activating a drive assembly or a brake control system of the vehicle in such a fashion that the vehicle is moved at a maneuvering speed, wherein the maneuvering condition prevails when the accelerator pedal position is inferior, or equal to, a limit value, when a first derivative of the accelerator pedal position is inferior, or equal to, a limit value, and/or when the vehicle speed is lower than, or equal to, a limit value.

* * * * *